US008485588B1

(12) United States Patent
Voss et al.

(10) Patent No.: US 8,485,588 B1
(45) Date of Patent: Jul. 16, 2013

(54) LOCALIZED IMPACT ENERGY ABSORBERS

(75) Inventors: Mark A. Voss, Richmond, MI (US);
Leonard J. Brohl, Jr., Ortonville, MI (US); Paul E. Krajewski, Troy, MI (US); Louis G. Hector, Jr., Shelby Township, MI (US); Keith S. Snavely, Sterling Heights, MI (US); Matthew F. Pawlicki, Williamsville, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/469,241

(22) Filed: May 11, 2012

(51) Int. Cl.
*B62D 25/10* (2006.01)

(52) U.S. Cl.
USPC .............. 296/187.04; 296/193.11; 180/69.22; 180/69.2

(58) Field of Classification Search
USPC ...................... 296/187.04, 193.11; 180/69.22, 180/69.2
See application file for complete search history.

(56) References Cited

U.S. PATENT DOCUMENTS

| 7,503,601 | B2 | 3/2009 | Agrahari |
| 7,959,197 | B2 | 6/2011 | Agrahari et al. |
| 8,016,331 | B2 | 9/2011 | Ralston et al. |
| 8,052,198 | B2 * | 11/2011 | Seksaria et al. .......... 296/187.04 |

* cited by examiner

*Primary Examiner* — Joseph Pape
(74) *Attorney, Agent, or Firm* — Quinn Law Group, PLLC

(57) ABSTRACT

A vehicle hood or a panel covering an object includes an inner surface and an outer surface. The inner surface faces the object and is offset from the object by a basin depth. The outer surface is substantially opposite the inner surface. A local energy absorber is operatively attached to the inner surface or is disposed between the inner surface and the object. The local energy absorber has a singly-connected structure, which includes a first wall portion and a second wall portion. The first wall portion is operatively attached to the inner surface. The singly-connected structure also includes a curved connector portion joining the first wall portion and the second wall portion.

16 Claims, 4 Drawing Sheets

US 8,485,588 B1

LOCALIZED IMPACT ENERGY ABSORBERS

TECHNICAL FIELD

This disclosure relates to management of exterior impacts to vehicle hoods and other exterior parts or panels.

BACKGROUND

Automobiles and other vehicles utilize a hood or bonnet, which is the hinged cover that allows access to the engine compartment for maintenance and repair. In many vehicles, but not all vehicles, the hood or bonnet is on the front of the vehicle, relative to the forward direction of travel.

SUMMARY

A vehicle panel, which may be a hood, covering an object is provided. The vehicle panel includes an inner surface and an outer surface. The inner surface faces the object and is offset from the object by a basin depth. The outer surface is substantially opposite the inner surface. A local energy absorber is disposed between the inner surface and the object.

The local energy absorber has a singly-connected structure, which includes a first wall portion, which is operatively attached to the inner surface, and a second wall portion. The local energy absorber also includes a curved connector portion joining the first wall portion and the second wall portion.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
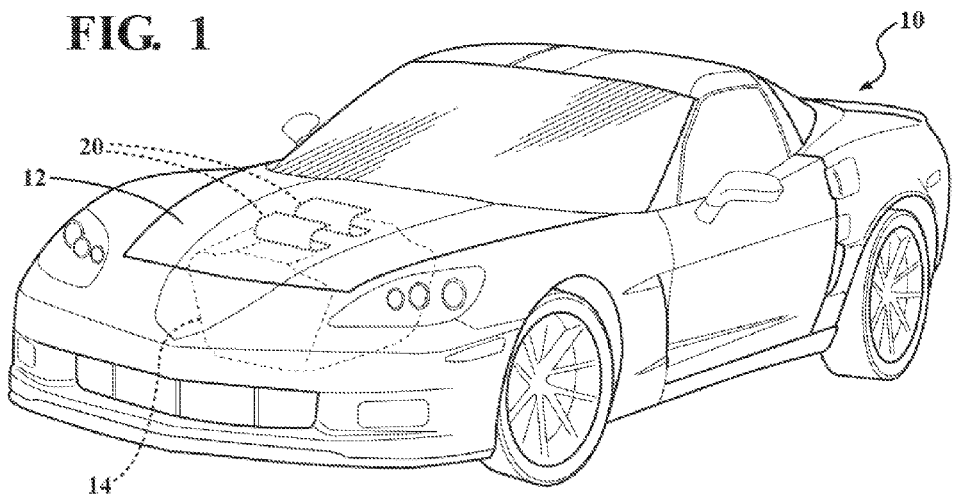
FIG. 1 is a schematic, isometric view of a vehicle having one or more localized impact absorbers under a hood.
Figure 2:
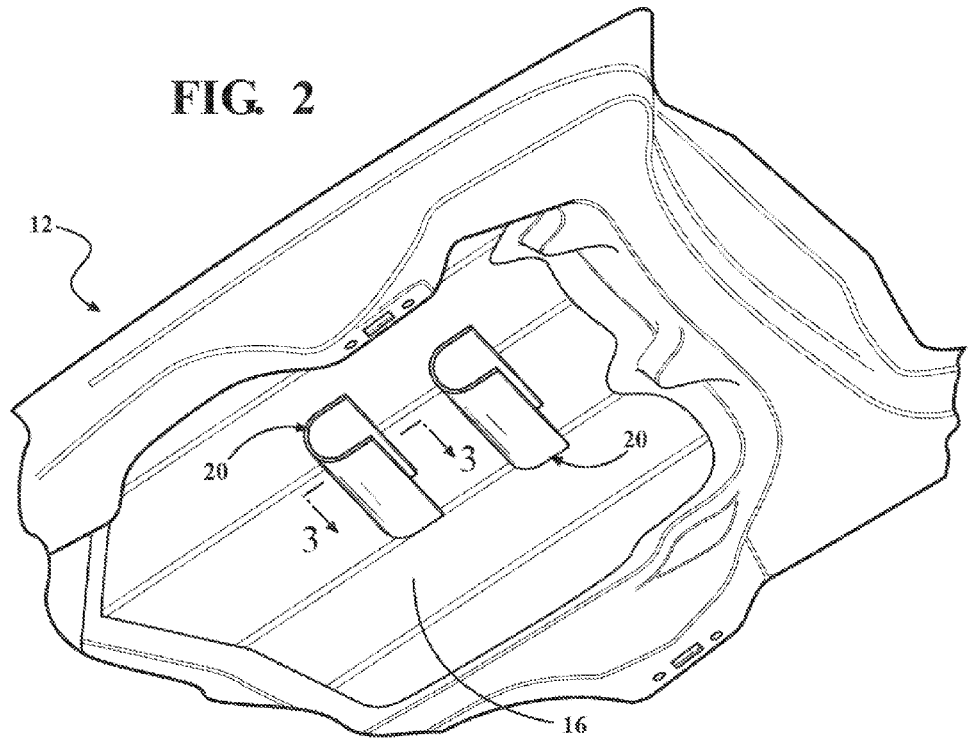
FIG. 2 is a schematic, isometric view of the underside of the hood shown in FIG. 1, showing the singly-connected localized impact absorbers.
Figure 3:
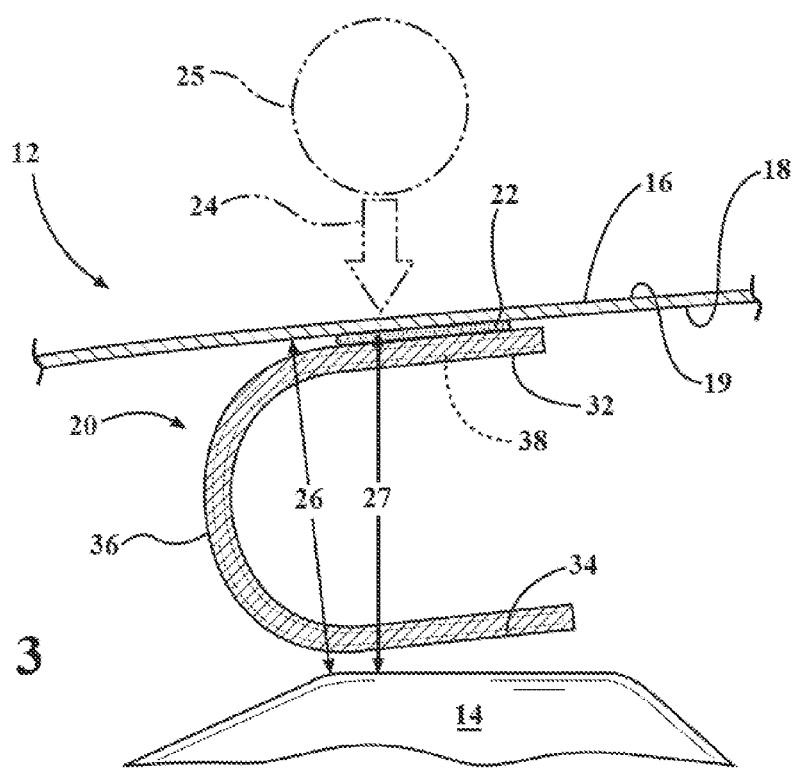
FIG. 3 is a schematic, cross-sectional view taken substantially along a line 3-3 of FIG. 2.

Referring to the drawings, wherein like reference numbers correspond to like or similar components wherever possible throughout the several figures, there are shown in FIG. 1, FIG. 2, and FIG. 3 various views of a vehicle 10 or portions thereof. The vehicle 10 has a vehicle hood 12 covering a rigid object or object 14.

FIG. 1 shows a schematic, isometric view of the vehicle 10 with the object 14 shown in dashed lines. The object 14 is associated with components within the engine compartment below the hood 12. FIG. 2 shows the underside of the hood 12, and FIG. 3 shows a cross-sectional view taken substantially along line 3-3 of FIG. 2. Features and components shown in other figures may be incorporated and used with those shown in FIGS. 1-3, and components may be mixed and matched between any of the configurations shown.

The vehicle hood 12 is generally illustrative of the forward region or the hood region of the vehicle 10. The object 14 is highly-illustrative, and may represent different components disposed within an engine compartment.

The vehicle 10 is shown for illustrative purposes and demonstrates only one possible environment into which the components described herein may be incorporated. The object 14 may be, for example and without limitation, an engine, a battery, a supercharger, a sway bar, or combinations thereof. As used herein, the term "rigid" is not used in an ideal sense, but represents relatively hard objects, or relatively heavy objects, that may result in damage during collisions.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" used are not intended to be limiting, and any specific component may be referenced with any number.

The hood 12 includes a hood panel 16 having an inner surface 18 facing the object 14 and an outer surface 19 substantially opposite the inner surface 18. A local energy absorber 20 is operatively attached to the inner surface 18 of the hood panel 16, such as through a bond 22. The local energy absorber 20 is a thin-walled shell structure that is singly connected, and is attached to the hood panel 16 adjacent to the object 14.

The bond 22 may be, for example and without limitation, an adhesive bond or a welded bond. The local energy absorber 20 could be attached to the inner surface 18, the outer surface 19, or even disposed between the inner surface 18 and the object 14 in the engine compartment of the vehicle 10.

The singly-connected structure or singly-connected body of the local energy absorber 20 is configured to absorb energy delivered by an impact load 24 to the outer surface 19 of the hood 12, such as from an object 25. The impact load 24 is represented as an arrow, and is illustrative only. The direction and type of impact may vary and the object 25 causing the impact load 24 may vary.

The inner surface 18 of the hood panel 16 is offset from the object 14 by a basin depth 26. The basin depth 26 may be defined or measured in different ways. In FIG. 3, the basin depth 26 is shown as the shortest absolute distance between the inner surface 18 and the object 14. However, an alternative measurement may be made along a line substantially parallel to the expected direction of the impact load 24, which is shown as alternative basin depth 27.

If the local energy absorber 20 were not attached to the hood panel 16, the impact load 24 may cause the hood panel 16 to deform until the hood panel 16 crosses the basin depth 26 and makes contact with the object 14. However the local energy absorber 20 is configured to dissipate energy from the impact load 24 before the hood panel 16 makes contact with the object 14, thereby reducing the force applied by impact with the object 14. The way in which the local energy absorber dissipates the impact load 24 may be quantified using the head injury criteria (HIC), or a HIC score. Without the local energy absorber 20, the peak loads experienced by the object 25 are higher and less energy is absorbed as the object 25 passes through the basin depth 26.

In experimental tests, the HIC score or variable would be derived from acceleration and time history of an accelerometer mounted at the centre of gravity of the object 25 when exposed to impact with the hood panel 16. The HIC score is a representation of the predicted response of the object 25 to the impact with the hood panel 16 and the underlying object 14, as dissipated by the local energy absorber 20. The HIC score includes the effects of the acceleration on the object 25 and the duration time of the acceleration. In some models or calculations of the HIC score, higher scores result from either: short impact duration times at larger accelerations, or longer impact duration times at smaller accelerations. For a given basin depth 26, the local energy absorber 20 is configured to minimize or reduce the HIC score. Alternatively, if required to meet a specific HIC score, the local energy absorber 20 is configured to do so while minimizing the basin depth 26.

The local energy absorber 20 includes the singly-connected structure, which has a first wall portion 32 operatively attached to the inner surface 18 and a second wall portion 34. A curved connector portion 36 joins the first wall portion 32 and the second wall portion 34. As shown in FIG. 3, the second wall portion 34 may be proximate to the object 14. The curved connector portion 36 is shown with a substantially-constant radius, but may have an alternative, non-constant radius geometry, such as parabolic or elliptical curves.

As used herein, the term "singly-connected structure" refers to structures or bodies in which any mathematical circuit 38 drawn within a cross section of the body can be reduced to a single mathematical point. The mathematical circuit 38 is a closed, continuous curve, and a mathematical point has no dimension other than its location. As the mathematical circuit 38 is reduced to smaller and smaller circuits, it will eventually converge to a point. In the present context, singly-connected bodies or structures may also be referred to as open-shell structures. Every closed curve or mathematical circuit 38 within the cross section can be capped with a closed surface, i.e., a surface without any holes.

Contrarily, a single mathematical circuit within "multiply-connected structures" cannot be reduced to a single point. Similarly, circuits of multiply-connected structures cannot be capped by closed surfaces. As a general rule, multiply-connected structures have holes in them, while singly-connected structures do not (they can have slots or channels, as in the open region of the C-shape shown).

Illustrative examples of basic, cross-sectional shapes that are singly connected include, without limitation: C-shapes, S-shapes, or U-shapes. Illustrative examples of cross-sectional shapes that are multiply connected include, without limitation: ovals, boxes, and figure eights. The mathematical topology of multiply-connected structures renders their structural response during impact completely different from the structural response of singly-connected bodies.

The singly-connected structure is formed integrally as a unitary body. In some configurations the singly-connected structure may be formed from one piece of a single material, such as, without limitation: a single piece of aluminum, steel, magnesium, or alloys thereof. Alternatively, the singly-connected structure may be formed by multiple pieces which are integrated into a unitary body, such as fiber-reinforced composites. For example, and without limitation, multiple layers of carbon fiber fabric may be joined in a resin matrix to create the unitary, singly-connected structure.

Other composite materials may also be used, including aramid or glass fibers or fabrics, and different composite materials may be united to form the singly-connected structure. The fibers used in the fiber-reinforced composite may be, for example, continuous, chopped, or woven. Furthermore, multi-directional layups may be used.

The local energy absorber 20 is shown and described herein on the vehicle hood 12. However, the local energy absorber 20 may also be used to reduce the effects of impacts to other exterior panels or portions of the vehicle 10. For example, and without limitation, the local energy absorber 20 may be located adjacent to: fenders, bumpers, or quarter panels. Note also that small holes placed in the local energy absorber 20, such as holes in the first wall portion 32 for attachment to the hood panel 16, would not destroy the singly-connected nature of structure, because the response to impact loading would be substantially unaffected by the holes.

In the vehicle hood 12 shown in FIGS. 1-3, the first wall portion 32 and the second wall portion 34 of the local energy absorber 20 are substantially parallel with each other and the inner surface 18 of the hood panel 16. As used herein, substantially parallel refers to the panels being within fifteen degrees of parallel, plus or minus. However, some embodiments may be configured with the first wall portion 32 and the second wall portion 34 even closer to parallel, such as within five or fewer degrees of parallel.

Under sufficient impact load 24, the hood panel 16 deforms and the local energy absorber 20 moves from the position shown toward the object 14. After the second wall portion 34 impacts the object 14, the local energy absorber 20 begins deforming and absorbs some of the energy of the impact load 24.

The singly-connected structure of the local energy absorber 20 has a different deformation response than multiply-connected structures. Deformation without fracture occurs while the strain and displacement of the structures remain compatible. The conditions for a compatible response to loading are dramatically different for singly-connected structures and multiply-connected structures. The requirement that these structures maintain compatibility of strain and displacement for non-fracture deformation is the reason why singly-connected and multiply-connected structures respond to loading so differently.

Many structures are configured to avoid fracture during deformation, but the singly-connected structure of the local energy absorber 20 may be configured to fracture in response to the impact load 24 being above a threshold load. Fractures are violations of compatibility between the strain and displacement within the local energy absorber 20. e Fracturing the local energy absorber 20 may absorb and dissipate energy from the impact load 24 by opening up new surfaces in the curved connector portion 36. The transfer of stored strain energy causes a crack to open some time after initial impact, which then dissipates strain energy into fracture propagation. The energy dissipated during fracture further prevents or minimizes high-energy contact between the object 14 and the object 25. The fracture may occur along the curved connector portion 36—i.e., in and out of the view shown in FIG. 3—such that much of the energy dissipated by the local energy absorber 20 is dissipated by the curved connector portion 36.

In the local energy absorber 20 shown in FIGS. 1-3, the singly-connected structure is shown as a metallic material, such as aluminum, magnesium, or alloys thereof. However, the local energy absorber 20 may be formed from other materials, as described herein.

In some configurations of the local energy absorber 20, the curved connector portion 36 moves from elastic deformation into fracture deformation substantially without plastic deformation. This may improve the HIC score resulting from the impact load 24 delivered by the object 25. If the local energy absorber 20 is formed from magnesium or magnesium allows, the curved connector portion 36 may move more-directly between elastic and fracture deformation than if the local energy absorber 20 is formed from aluminum. Magnesium alloys may experience very little plastic deformation between elastic deformation and fracture deformation, but usually will experience some plastic deformation.

The local energy absorber 20 may be formed by bending a flat sheet—which is a singly-connected structure—of material around a curved form, a bar, or a mandrel. Additionally, the local energy absorber 20 may be pre-formed by stamping or embossing patterns, thickness variations, or curves in the flat sheet before curving the sheet. The local energy absorber 20 need not be roll-formed because the curved connector portion 36 can be formed by bending. Furthermore, roll-forming may result in seams or channels, which may or may not be desirable. Note also that magnesium and magnesium alloys may not be capable of roll-forming, especially at or near room temperature. When the local energy absorber 20 is formed from carbon or other composite materials, the local energy absorber 20 may be molded to its final shape during the manufacturing and layup process.

Figure 4:
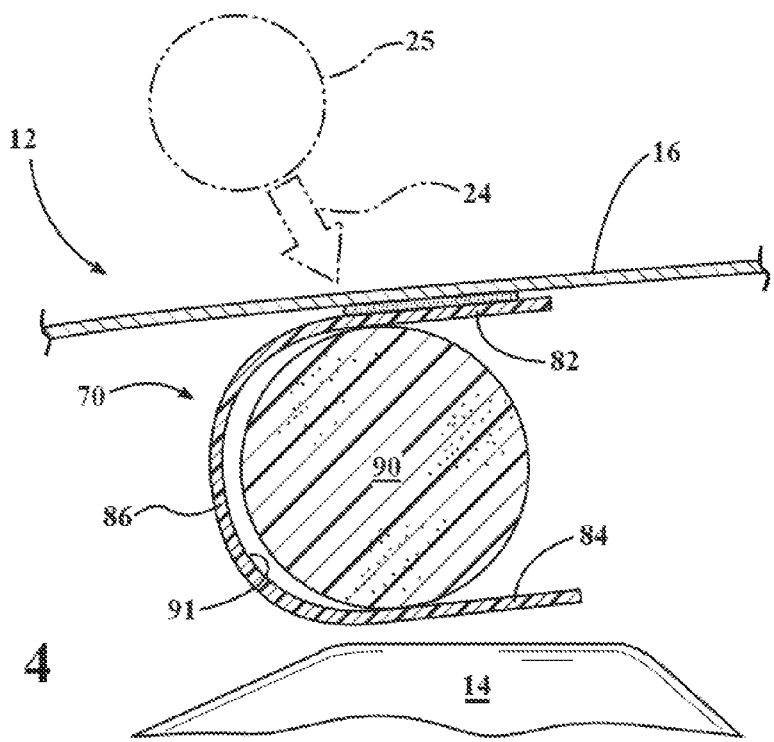
FIG. 4 is a schematic, plan view of another localized impact absorber attached to the underside of a vehicle hood, and having a core member inserted into the singly-connected structure.

Referring now to FIG. 4, and with continued reference to FIGS. 1-3, there is shown an alternative configuration of a local energy absorber 70, which may also be attached to the hood panel 16. As shown in FIG. 4, local energy absorber 70 includes a singly-connected structure having a first wall portion 82, a curved connector portion 86, and a second wall portion 84. Features and components shown in other figures may be incorporated and used with those shown in FIG. 4, and components may be mixed and matched between any of the configurations shown.

The singly-connected structure of the local energy absorber 70 defines an open cavity 91. Unlike the configuration shown in FIGS. 1-3, the local energy absorber 70 shown in FIG. 4 includes a crushable core member 90 disposed within the open cavity 91. The crushable core member 90 may be, for example and without limitation, foam, honeycomb, or an envelope filled with gel or crushable pellets. The crushable core member 90 may have different cross-sectional shapes, such as, without limitation: semi-circular (one-half of a circle), elliptical, rectangular, or polygonal cross-sections. Furthermore, when the crushable core member 90 is smaller in cross section than the open cavity 91, the crushable core member 90 may be attached or bonded to any of the inner surfaces of the first wall portion 82, the curved connector portion 86, the second wall portion 84, or portions of multiple elements.

The crushable core member 90 further dissipates energy from the impact load 24 to the local energy absorber 70. Therefore, the crushable core member 90 may further assist in managing impacts between the object 25, the hood panel 16 and the object 14. The crushable core member 90, or similar crushable core structures, may be incorporated into any of the other local energy absorbers shown and described herein.

Note that even though the crushable core member 90 may be disposed within the local energy absorber 70, the local energy absorber 70 still has a singly-connected structure. In the local energy absorber 70 shown in FIG. 4, the singly-connected structure is formed from composite materials, such as carbon fibers or fabrics, aramid fibers or fabrics, and resin matrix. Fracture of the composite materials, combined with internal deformation, fracturing, or both, of the crushable core member 90, dissipates impact energy, and may reduce the HIC score of the hood panel 16 relative to embodiments without the local energy absorber 70. The crushable core member 90 may also be used with local energy absorbers 70 formed from metal.

Furthermore, the composite materials may allow the local energy absorber 70, and particularly the curved connector portion 86, to move substantially directly between elastic and fracture deformation, as opposed to aluminum (having substantial intermediate plastic deformation) or magnesium (having less, but some, intermediate plastic deformation). The crushable core member 90 provides a visco-elastic or visco-plastic deformation which is time-dependent, such that the crushable core member 90 acts as a damping entity for the local energy absorber 70.

Referring now to FIG. 5A, FIG. 5B, FIG. 5C, and FIG. 5D, and with continued reference to FIGS. 1-4, there are shown four cross-sectional views of alternative local impact energy absorbers. Each of the local energy absorbers shown may be used with hood panels similar to that shown in FIGS. 1-3. Features and components shown in other figures may be incorporated and used with those shown in FIGS. 5A-5D, and components may be mixed and matched between any of the configurations shown.

Figure 5A:
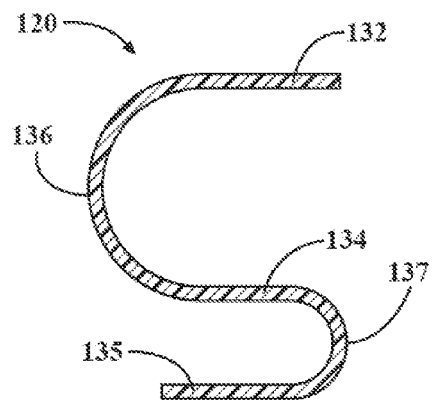
FIG. 5A is a schematic, cross-sectional view of another localized impact absorber formed from an S-shaped, singly-connected structure.

FIG. 5A shows a schematic, cross-sectional view of a local energy absorber 120 formed from a singly-connected structure. The local energy absorber 120 is a singly-connected structure, and includes a first wall portion 132 operatively attached to a hood panel (not shown) and a second wall portion 134 distal from the first wall portion 132.

A first curved connector portion 136 joins or connects the first wall portion 132 and the second wall portion 134. The singly-connected structure of the local energy absorber 120 further includes a third wall portion 135 distal from the second wall portion 134 and a second curved connector portion 137 connecting the second wall portion 134 and the third wall portion 135. Therefore, the local energy absorber 120 generally forms an S-shape. Each of the first wall portion 132, the second wall portion 134, and the third wall portion 135 are generally parallel to the hood panel (not shown) to which the local energy absorber 120 is attached.

The first curved connector portion 136 and the second curved connector portion 137 both dissipate energy absorbed from impact loads (not shown). As the first curved connector portion 136 and the second curved connector portion 137 deforms under loading, energy is dissipated. In the local energy absorber 120 shown in FIG. 5A, the singly-connected structure is formed from composite materials, such as carbon fibers or fabrics, aramid fibers or fabrics, and resin matrix, but may also be formed from metals. If the load is high enough, deformation may cause fractures in the first curved connector portion 136 and the second curved connector portion 137, and energy will be dissipated by each of the respective fracture events.

The first curved connector portion 136 has a first radius, and the second curved connector portion 137 has a second radius, which is different from the first radius. Therefore, in the local energy absorber 120 shown in FIG. 5A, the S-shaped singly-connected body has differently-sized radii. Alternatively, the first and second curved connector portions 136, 137 may have equal radii or equally-shaped elliptical curves. Furthermore, the relative curves may be smaller (or tighter) than those shown in FIG. 5A.

Figure 5B:
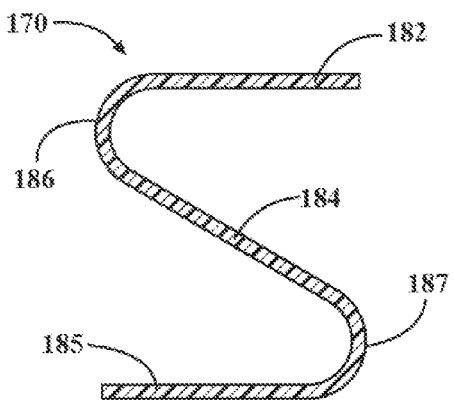
FIG. 5B is a schematic, cross-sectional view of another localized impact absorber formed from a different S-shaped, singly-connected structure.

FIG. 5B shows a schematic, cross-sectional view of a local energy absorber 170 formed from a singly-connected structure. The local energy absorber 170 is a singly-connected structure, and includes a first wall portion 182 operatively attached to a hood panel (not shown) and a second wall portion 184 distal from the first wall portion 182.

A first curved connector portion 186 joins the first wall portion 182 and the second wall portion 184. The singly-connected structure of the local energy absorber 170 further includes a third wall portion 185 and a second curved connector portion 187 joining the second wall portion 184 and the third wall portion 185.

The local energy absorber 170 generally forms an S-shape or Z-shape. The first wall portion 182 and the third wall portion 185 are generally parallel to the hood panel to which the local energy absorber 170 is attached. However, the second wall portion 184 of the local energy absorber 170 is not parallel to the hood panel.

Figure 5C:
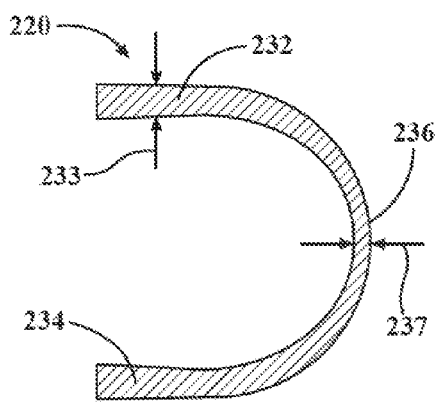
FIG. 5C is a schematic, cross-sectional view of another localized impact absorber formed from a singly-connected structure with varied properties along the cross section.

FIG. 5C shows a schematic, cross-sectional view of a local energy absorber 220 formed from a singly-connected structure. Unlike the other singly-connected bodies shown, the local energy absorber 220 has a singly-connected structure with varied properties along the cross section. The local energy absorber 220 is, however, generally consistent along the length of the singly-connected structure, such that any cross section taken along local energy absorber 220 looks similar to that shown in FIG. 5C.

The local energy absorber 220 includes a first wall portion 232 operatively attached to a hood panel (not shown) and a second wall portion 234 distal from the first wall portion 232. A first curved connector portion 236 joins the first wall portion 232 and the second wall portion 234.

As shown in FIG. 5C, the first wall portion 232 has a first thickness 233. Similarly, the curved connector portion 236 has a second thickness 237. In the configuration shown, the first thickness 233 of the first wall portion 232 is substantially different from the second thickness 237 of the curved connector portion 236. Therefore, local energy absorber 220 has a singly-connected structure with variable properties along its cross section. The thickness of the second wall portion 234 may or may not be substantially different from the first thickness 233 or the second thickness 237. Note that either the first thickness 233 or the second thickness 237 may be larger.

As used when referring specifically to the first thickness and the second thickness, the term "substantially different" refers to differences in dimension that are beyond those of ordinary manufacturing variability. For example, a ten-millimeter sheet that is bent or stamped into a U-shape may vary in thickness between eight to twelve millimeters due to variability in the forming process. This variability would not amount to being configured with a substantially different second thickness. However, if the walls of the U-shape have a first thickness of ten millimeters but the radial portion has a second thickness of twenty millimeters, the second thickness would be substantially different.

Incorporating substantially different thicknesses into the local energy absorber 220 may allow tuning of the response characteristics—specifically, of the accumulation of strain energy—of the local energy absorber 220 under impact loads (not shown). For example, the first wall portion 232 may elastically deform under some loads that plastically deform the curved connector portion 236, or vice versa.

Figure 5D:
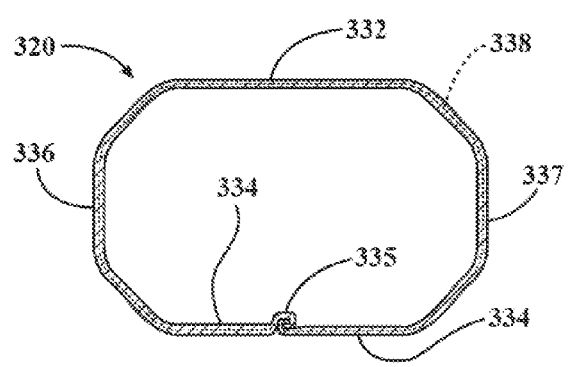
FIG. 5D is a schematic, cross-sectional view of a localized impact absorber formed from a multiply-connected structure.

FIG. 5D is a schematic, cross-sectional view of a local energy absorber 320. Unlike those shown in the other figures, the local energy absorber 320 is a multiply-connected structure.

The local energy absorber 320 includes a first wall portion 332 operatively attached to a hood panel (not shown) and a second wall portion 334 distal from the first wall portion 332. The second wall portion 334 includes a joint or hem 335. Therefore, the local energy absorber 320 is multiply connected because the structure is closed around a hole. Alternatively, the local energy absorber 320 may be formed as a solid extrusion, without the hem 335, or may be welded at the hem 335 to join the structure.

A first connector portion 336 joins the first wall portion 332 and the second wall portion 334. Additionally, a second connector portion 337 also joins first wall portion 332 and the second wall portion 334.

As shown, a mathematical circuit 338 drawn within a cross section of the body of the local energy absorber 320 cannot be reduced to a single mathematical point. As the mathematical circuit 338 is reduced to smaller and smaller circuits, it will eventually be blocked by the center portion of the octagonal structure, and will never converge to a single point.

Therefore, the local energy absorber 320 is a multiply-connected structure. For substantially identical materials, and substantially identical basin depths, the local energy absorber 320 may have a higher HIC score than a singly-connected structure, such as the local energy absorber 20 or the local energy absorber 70 shown in FIGS. 1-4.

Figure 6:
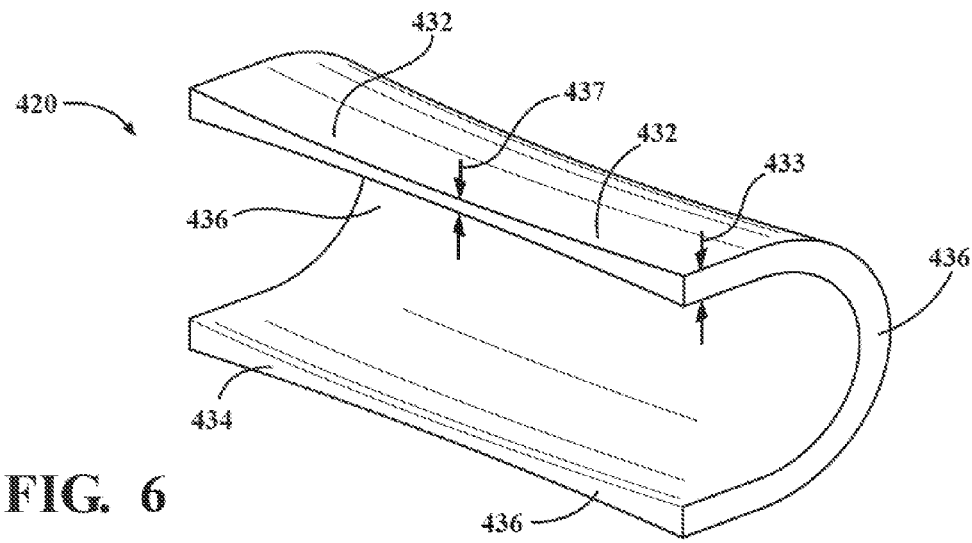
FIG. 6 is a schematic, isometric view of another localized impact absorber formed from a singly-connected structure with varied properties along the length of the body.

Referring now to FIG. 6, and with continued reference to FIGS. 1-5D, there is shown a schematic, isometric view of another local energy absorber 420 formed from, or as, a singly-connected structure. The local energy absorber 420 may be attached between a hood panel (not shown) and an object (not shown, which may be substantially rigid) to dissipate energy transferred between exterior objects (not shown) and the object. Features and components shown in other figures may be incorporated and used with those shown in FIG. 6, and components may be mixed and matched between any of the configurations shown.

The local energy absorber 420 includes varied properties along the length of the singly-connected structure, but has substantially identical properties along any given cross section. The local energy absorber 420 may be formed from composite materials, such as carbon fiber and honeycomb.

The local energy absorber 420 includes a first wall portion 432, which may be operatively attached to the hood panel, and a second wall portion 434 distal from the first wall portion 432, which may be adjacent to the object. A first curved connector portion 436 joins the first wall portion 432 and the second wall portion 434.

As shown in FIG. 6, the ends of the local energy absorber 420 have a first thickness 433. Similarly, the central portion of the local energy absorber 420 has a second thickness 437. The first thickness 433 is substantially different from the second thickness 437. Therefore, local energy absorber 420 has singly-connected structure with variable properties along its length, but not its cross section.

As an alternative to varying the thickness of the local energy absorber 420, or in addition to varying the thickness, the local energy absorber 420 may include other varied properties along its length. For example, the first wall portion 432 may be configured with a first rigidity under the impact loading. The curved connector portion 436 may be configured with a second rigidity under impact loading, and the second rigidity may be substantially different from the first rigidity.

Varied levels of rigidity throughout cross sections, or in different lengthwise regions, of the local energy absorber 420 may be achieved by locally varying heat treatment of metals forming the local energy absorber 420. For example, the curved connector portion 436 may be annealed to reduce rigidity relative to the first wall portion 432 and the second wall portion 434. Furthermore, the properties may be varied along the length of the local energy absorber 420, such that, for example, the center section is softer than the end sections.

Varied rigidity may also be achieved by changing the structure of composite materials forming the local energy absorber 420. For example, the ends of the local energy absorber 420 may have unidirectional glass reinforcement members added to the composite structure to increase the stiffness and rigidity of the ends.

Alternatively, layers of carbon fiber fabric forming the local energy absorber 420 may have different layup or ply directions in different portions of the local energy absorber 420. For example, the layers may be arranged in a 0-45-90 degree pattern in the curved connector portion 436, but have a 0-90-0 degree pattern in the first wall portion 432 and the second wall portion 434. The different ply orientations may affect the HIC score by changing the response to loading in the different areas.

As another alternative, an energy absorber may be formed with combinations of features shown in FIGS. 5C and 6. For example, a low-frequency wave shape could be embossed in a metallic sheet, and then the sheet could be rolled or bent into to the shape shown in FIG. 6. The resulting energy absorber would have undulating thickness both along its length and its cross sections.

Figure 7:
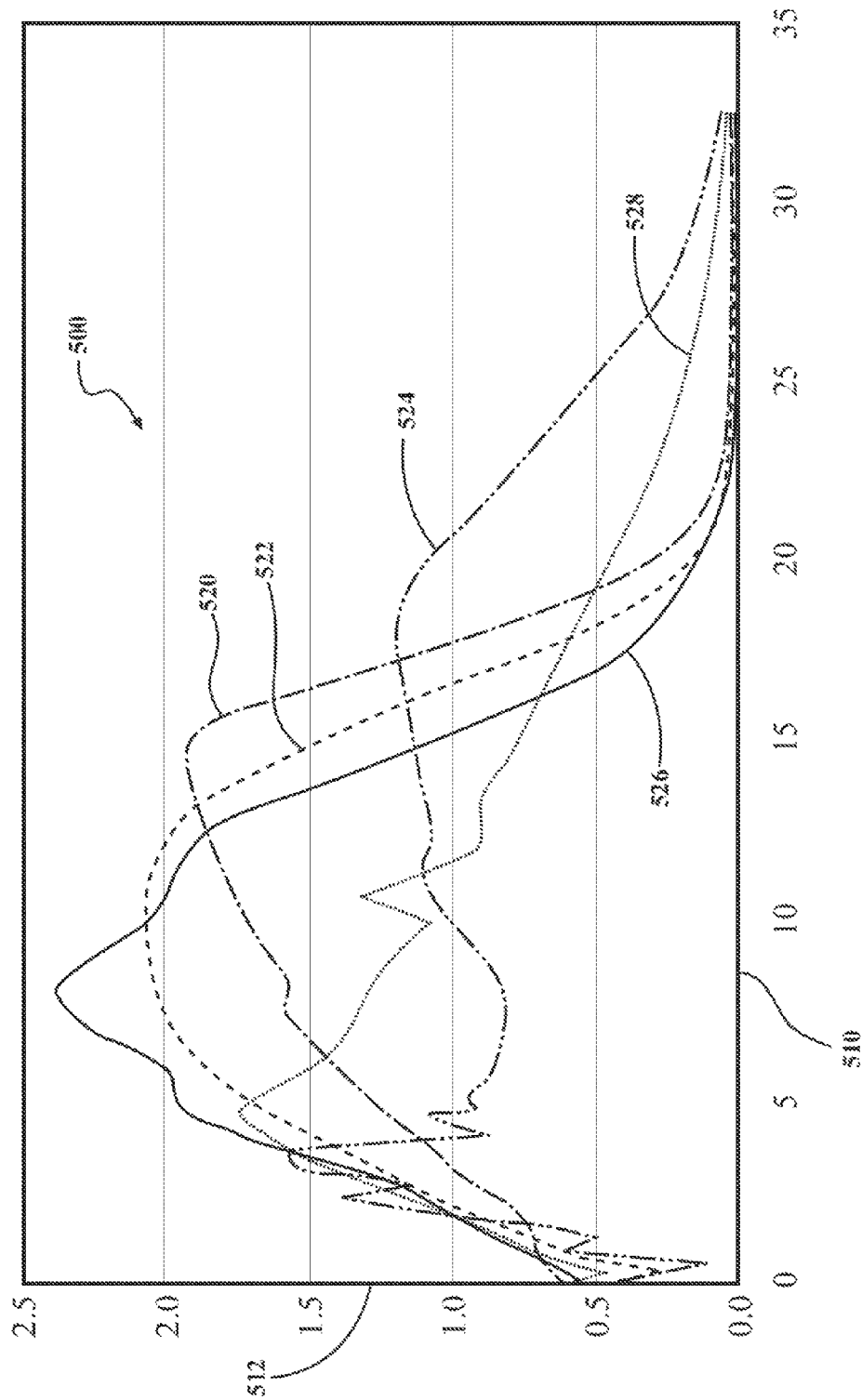
FIG. 7 is a schematic chart showing results of illustrative localized impact absorbers formed from different materials.

Referring now to FIG. 7, and with continued reference to FIGS. 1-6, there is shown a schematic chart 500, which illustrates test results of five sample local energy absorbers formed from various materials. The samples received a simulated impact load while measuring the resulting response characteristics.

The chart 500 does not show the exact test results, but shows illustrative representations of the results, which may have been smoothed and clarified. Each of the five test samples was substantially similar in size and was formed as a singly-connected structure similar to those shown in FIGS. 1-3. None of the sample local energy absorbers included a foam damping insert.

The chart 500 includes an x-axis 510 showing time lapse in milliseconds (ms). A y-axis 512 shows the load response in kilonewtons (kN).

A first material 520 is an aluminum alloy, aluminum 5182. A second material 522 is another aluminum alloy, aluminum 6111-T6.

A third material 524 is a formed from composite materials. The third material 524 is a six-ply carbon fiber weave, with the plies oriented in a 0-90-0 degree arrangement.

The other sample local energy absorbers are magnesium alloys. A fourth material 526 is magnesium ZEK100, and a fifth material 528 is magnesium AZ31.

The chart 500 shows an illustrative comparison of the responses of the different materials to impacts. HIC scores may be calculated or determine from the data collected in these tests.

HIC scores from some of these tested materials were calculated and are included herein. However, note that the HIC scores are illustrative only and are not intended for any purpose other that illustrating relative differences between similarly shaped and sized testing samples formed from differing materials. The second material 522, aluminum 6111-T6, achieved HIC scores of approximately 1080-1120. The fourth material 526, magnesium ZEK100, achieved HIC scores of approximately 1050-1090. The fifth material 528, magnesium AZ31, achieved HIC scores of approximately 940-980.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A vehicle hood covering an object, comprising:
   an inner surface of the vehicle hood facing the object and offset from the object, and an outer surface of the vehicle hood substantially opposite the inner surface; and
   a local energy absorber operatively attached to the inner surface of the vehicle hood, wherein the local energy absorber has a singly-connected structure, which includes:
      a first wall portion operatively attached to the inner surface;
      a second wall portion distal to the inner surface; and
      a curved connector portion joining the first wall portion and the second wall portion.

2. The vehicle hood of claim 1, wherein the first wall portion and the second wall portion of the local energy absorber are substantially parallel with each other and the inner surface of the vehicle hood.

3. The vehicle hood of claim 2, wherein the first wall portion, the curved connector portion, and the second wall portion define an open cavity, and further comprising:
   a crushable core member disposed within the open cavity.

4. The vehicle hood of claim 1, wherein the curved connector portion of the local energy absorber is a first curved connector portion, and the singly-connected structure further includes:
   a third wall portion; and
   a second curved connector portion joining the second wall portion and the third wall portion.

5. The vehicle hood of claim 4, wherein the first wall portion and the third wall portion of the local energy absorber are substantially parallel with each other and with the inner surface of the vehicle hood.

6. The vehicle hood of claim 4,
   wherein the first curved connector portion has a first radius; and
   wherein the second curved connector portion has a second radius, different from the first radius.

7. The vehicle hood of claim 1,
   wherein the first wall portion has a first thickness; and
   wherein the curved connector portion has a second thickness, substantially different from the first thickness.

8. The vehicle hood of claim 1,
   wherein the first wall portion has a first rigidity;
   wherein the curved connector portion has a second rigidity, substantially different from the first rigidity.

9. The vehicle hood of claim 1, wherein the singly-connected structure is configured to fracture in response to impact loading above a threshold load.

10. The vehicle hood of claim 9, wherein the curved connector portion moves from elastic deformation into fracture deformation substantially without plastic deformation, when subjected to impact loading above the threshold load.

11. The vehicle hood of claim 10, wherein the singly-connected structure is formed from composite materials, including at least one of carbon fiber and aramid fiber.

12. A vehicle panel covering an object, comprising:
- an inner surface facing the object and offset from the object, and having an outer surface substantially opposite the inner surface; and
- a local energy absorber disposed between the inner surface and the object and having a singly-connected structure, wherein the singly-connected structure includes:
  - a first wall portion proximate to the inner surface;
  - a second wall portion distal to the inner surface, wherein the first wall portion and the second wall portion of the local energy absorber are substantially parallel with each other and the inner surface; and
  - a curved connector portion joining the first wall portion and the second wall portion.

13. The vehicle panel of claim 12, wherein the singly-connected structure is configured to fracture in response to impact loading above a threshold load.

14. The vehicle panel of claim 13, wherein the curved connector portion of the local energy absorber is a first curved connector portion, and the singly-connected structure further includes:
- a third wall portion; and
- a second curved connector portion joining the second wall portion and the third wall portion.

15. The vehicle panel of claim 14, wherein the first wall portion and the third wall portion of the local energy absorber are substantially parallel with each other and with the inner surface.

16. The vehicle panel of claim 13, wherein the first wall portion, the curved connector portion, and the second wall portion define an open cavity, and further comprising:
- a crushable core member disposed within the open cavity.

* * * * *